United States Patent [19]  [11] 3,822,577
Roberts  [45] July 9, 1974

[54] METHOD FOR MAKING UNIVERSAL BLADE CONSTRUCTION

[75] Inventor: Harry W. Roberts, Merrick, N.Y.

[73] Assignee: Pylon Manufacturing Corporation, Ft. Lauderdale, Fla.

[22] Filed: June 6, 1973

[21] Appl. No.: 367,245

Related U.S. Application Data

[62] Division of Ser. No. 197,776, Nov. 11, 1971.

[52] U.S. Cl. ................................................. 72/379
[51] Int. Cl. ............................................ B21d 53/88
[58] Field of Search ............ 72/377, 379; 15/250.42

[56] References Cited
UNITED STATES PATENTS
3,060,480  10/1962  Ziegler ............................ 15/250.42
3,350,738  11/1967  Anderson ........................ 15/250.42
3,473,186  10/1969  Mainka ............................ 15/250.42
3,616,485  11/1971  Quinlan et al. .................. 15/250.42

Primary Examiner—Lowell A. Larson
Attorney, Agent, or Firm—Molinare, Allegretti, Newitt & Witcoff

[57] ABSTRACT

A universal blade construction adapted to fit windshield wipers having yokes with different width dimensions between the blade-straddling claws that retain the blade construction. The blade construction includes a backing strip providing a longitudinal slot-like opening formed by a pair of substantially parallel side rails which are upset at the centers inwardly of the center line of each said rail to cause a lateral bowing effect between the center and each end, whereby the blade construction will fit snugly in between claws of different widths.

4 Claims, 7 Drawing Figures

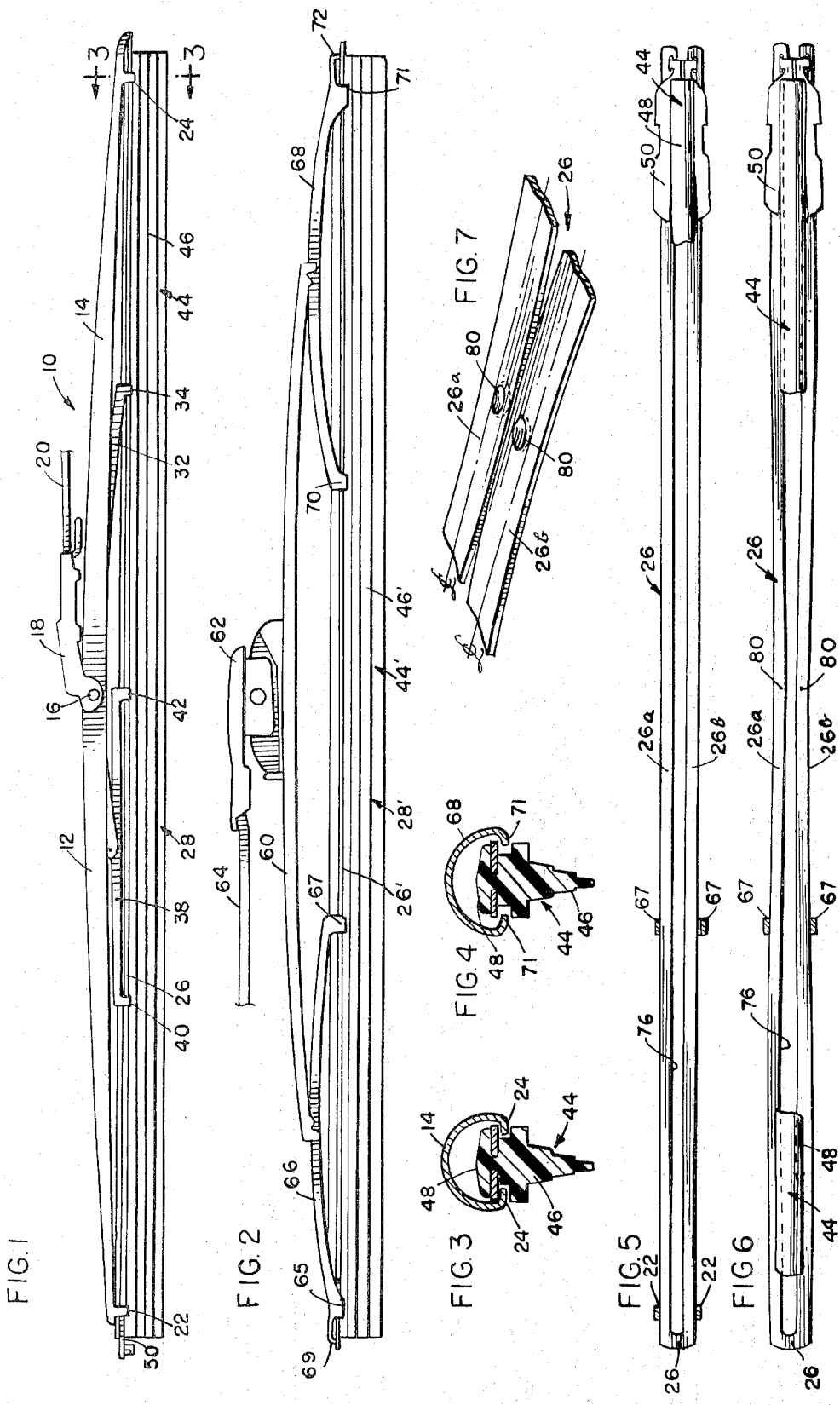

METHOD FOR MAKING UNIVERSAL BLADE CONSTRUCTION

RELATED APPLICATION

This is a division of application Ser. No. 197,776, filed Nov. 11, 1971.

BACKGROUND OF THE INVENTION

This invention relates to a universal blade construction and more particularly to an improved blade construction that will fit yokes having cooperating pairs of claws with different dimensions between the claws that straddle and engage the blade construction.

A typical windshield wiper blade assembly includes a blade, a flexible backing strip for mounting the blade, and a yoke for holding the blade and backing strip in position on a windshield for wiping same when desired. Present commercial windshield wiper yokes are made to essentially two sizes or spacings between cooperating pairs of claws on the yoke. Additional variations in dimensions between cooperating claws of a pair occur through use and assembly and disassembly of wiper blade constructions from between the claws of a yoke. A problem arises in connecting a wiper blade construction adapted for one type of yoke to another type of yoke because of the differences in width dimension between cooperating claws. In the event that a blade construction adapted for a smaller dimension claws is used in a yoke having a larger dimension between claws, it is subject to disengagement from the yoke, with the result that the claws may contact a windshield and scratch or otherwise damage same. A blade construction designed for a wider dimension between cooperating claws would not fit between the cooperating claws of a yoke designed for a narrower dimension between cooperating claws.

An object of the present invention is to provide a universal wiper blade construction that is adapted to be used with all present commercial yokes.

Another object of the present invention is to provide an improved universal wiper blade construction having self-adjusting means built into the blade construction such that it will be useable with yokes having different dimensions between the claws that straddle and engage the wiper blade construction.

Yet another object of the present invention is to provide a wiper blade construction comprising a backing strip having a pair of substantially parallel side rails connected at an end, with the material of the side rails being upset at the centers, inwardly of the center lines of the side rails so as to bow the side rails laterally between the centers and each end to provide a maximum transverse dimension larger than the dimension when the side rails were parallel, whereby the wiper blade construction will firmly engage pairs of claws having a wide range of dimensions therebetween.

It is yet another object of this invention to provide an improved method for forming a universal blade construction which comprises the step of upsetting the metal of the backing strip of the wiper blade construction inwardly of the longitudinal center lines of the parallel side rails and substantially at the center between the ends so as to bow the rails outwardly, transversely between the centers and the ends of the rails to provide a maxiumum transverse dimension larger than the dimension if the side rails were parallel, whereby such wiper blade construction will firmly engage pairs of claws having different dimensions therebetween.

Still another object of the present invention is to provide an improved universal blade construction that is self-adjusting so as to accommodate yokes having different dimensions between the claws resulting from design differences, manufacturing tolerance differences, or differences resulting from use. Other objects and advantages of the present invention will become more apparent here and after.

BRIEF DESCRIPTION OF THE DRAWINGS

There is shown in the attached drawing, a presently preferred embodiment of the present invention, wherein like numerals in the different views relate to like elements and wherein:

FIG. 1 is a side elevational view of a windshield wiper assembly to which the improved blade construction of the present invention may be applied;

FIG. 2 is a side elevational view of a different windshield wiper assembly to which the present invention may be applied;

FIG. 3 is a cross-sectional view of the windshield wiper assembly of FIG. 1, taken generally along line 3—3 of FIG. 1;

FIG. 4 is an end view similar to FIG. 3, illustrating a yoke like that of the windshield wiper assembly of FIG. 2, and utilizing a conventional blade construction;

FIG. 5 is a plan view of a backing strip prior to the invention being applied thereto;

FIG. 6 is a plan view of a backing strip embodying principles of the present invention, with the blade being broken away for clarity; and FIG. 7 is an enlarged detail view of the central portions of the backing strip of FIG. 6.

DETAILED DESCRIPTION OF THE PRESENT INVENTION

Referring to FIGS. 1 and 2, there are illustrated windshield wipers having yoke assemblies of the types commonly used commercially. In FIG. 1, the wiper blade assembly 10 is comprises of a yoke or superstructure including levers 12 and 14 pivotally mounted on a pin or rivet 16, which also mounts a clip 18 to which a wiper arm 20 may be detachably connected. A spring (not shown) encircles the intermediate portion of the pin 16 and bears downwardly on the separate levers 12 and 14 so as to urge the ends of the levers 12 and 14 toward the windshield to be wiped. The outer ends of the levers 12 and 14 are formed with pairs of cooperating blade-straddling claws 22 and 24, which slidably engage opposite sides of the backing strip of the blade construction 28. A lever 32, also pivotally mounted on the pin or rivet 16, has one end thereof formed into a pair of cooperating blade-straddling claws 34, which slidably engage opposite sides of the backing strip 26 of blade construction 28. The other end of the lever 32 is formed into a claw-like portion 36 which pivotally supports the pressure equalizer 38, the opposite ends of which are formed into blade straddling claws 40 and 42 respectively for cooperatively engaging with the backing strip 26.

The improved blade construction 28 is comprised of wiper blade 44 suitably secured in my novel backing strip 26. The wiper blade 44 consists of a wiping lip 46 and a retaining head or bead 48 connected by a reduced connecting portion 47 which is adopted to be retained within the longitudinally extending opening or slot in the backing strip 26.

The backing strip 26 may be comprised of a pair of generally parallel side rails connected integrally at one end and defining a longitudinally extending opening therein for holding the reduced portion of the wiper blade 44. The opposite ends of the side rails are held by a latch clip or latch element 50, which also cooperates with the yoke to hold the blade construction 28 relative to the yoke. For details of the specific latch clip or latch element 50, reference may be made to my copending application Ser. No. 131,091, filed Apr. 5, 1971. The specific latch clip employed with the novel backing strip is not part of this invention—other types of latching means can be employed.

Turning to FIG. 2, there is shown a wiper blade assembly having a modified yoke or superstructure with which the improved wiper blade construction 28 of this invention may be used. The superstructure or yoke may be of the type shown in Krohm U.S. Pat. No. 3,195,162. As seen in FIG. 2, the lever 60 is pivotally connected to the mounting clip 62, that is, in turn, connected to an arm 64 of the windshield wiper assembly. Levers 66 and 68 are each pivoted to the arm 60. Lever 66 is provided with pairs of cooperating blade-straddling claws 65 and 67 and an outer stop 69 is provided adjacent the claws 65. Likewise, the lever 68 is provided with pairs of claws 70, 71 with an outer stop 72 being provided adjacent to the pair of claws 72.

The blade construction 28' is essentially the same as blade construction 28, except that the backing strip 26 is wider in overall dimension so as to cooperate properly with the wider transverse spacings between the cooperating pairs of blade-straddling claws 65, 67, 70 and 72.

Essentially, to assemble the blade construction 28 into the yoke of FIG. 1, the backing strip 26 is inserted into the claws 22 at one end and then fed through the additional pairs of claws 40, 42, 34 and 24, until the right end of the blade 46 engages the stop at the right end of the arm 14. The claws 22 will engage with the latching mechanism or latch clip 50 to retain the blade assembly 28 in position.

With respect to assembly of blade construction 28' with the yoke in FIG. 2, the blade construction 28' is engaged with the claws 70, 72 of lever 68. Then the blade assembly 28' will be moved to the left as viewed in FIG. 2 to engage the claws 67 and then claws 65 with the backing strip 26. Stop 69 will be engaged with the blade to hold same in place. With levers 66 and 68 secured to lever 60, the blade construction 28' is retained on the yoke for movement therewith to clean a windshield.

With reference to FIG. 3, there is illustrated an end view of the construction of FIG. 1. It will be noted that the backing strip 26 has approximately the same maximum transverse dimension as the spacing between cooperating claws 22. The other pair of claws 40, 42, 34 and 24 have the same transverse spacing. Thus, the backing strip 26 is snugly engaged by the claws.

In the event the blade construction 28 is attempted to be used with the yoke of FIG. 2, it will be noted from FIG. 4 that there is free space between the sides of the rails of the backing strip and the claws. The spacing between the cooperating pairs of claws of the wiper blade assembly 10 is greater than the transverse width of the backing strip 28. A conventional blade construction having parallel side rails, intended for the yoke of FIG. 1, could not therefore be used for the yoke of FIG. 2, without alteration of the yoke.

There is schematically illustrated pairs of claws associated with the backing strip 26. The first claws 22 illustrate the lesser spacing between cooperating claws (as in the yoke embodiment of FIG. 1) and the second claws 65 illustrate a greater spacing between cooperating claws (as in the yoke embodiment of FIG. 2). In view of this, it is possible for twisting to occur such that the backing strip 26 would become disengaged from the claws of the yoke assembly 10. The claws might then engage the windshield and scratch same, thus resulting in material damage to the windshield, possibly requiring replacement.

FIG. 5 shows a backing strip 26 of conventional design having a pair of substantially parallel side rails 26a and 26b defining a longitudinally extending opening therebetween 76, which opening is adapted to receive the reduced portion between the head and wiping portion of the blade 44. The ends of the side rails 26a and 26b are suitably held in spaced apart relationship. As shown, the portion 26c integrally connects the substantially parallel arms 26a and 26b. Assuming that the backing strip 26 were designed for use in the construction of FIG. 1, such backing strip would be too narrow for the blade-straddling claws 65 of FIGS. 2 and 4 for example. There would be additional space between the sides of the side rails and the claws through which the claws could become disengaged from the backing strip 26.

With reference to FIG. 6, there is shown a backing strip 26 embodying principles of the present invention. The backing strip 26 is formed from spring metal and includes arms or side rails 26a and 26b which are upset centrally of the ends so as to bow the portions intermediate the central portion and the ends laterally. The upsetting may be accomplished by center punching as indicated at 80, or likewise treating the central portion of the side rails in that portion lying within the longitudinal center lines of the side rails 26 a and 26b so as to create the bowing effect illustrated in FIG. 6. As a result of the bowing, a blade construction embodying the novel backing strip becomes self-adjusting, since the side rails in the bowed portion have a transverse dimension greater than the transverse dimension of the construction of FIG. 5. A strain force is created in the side rails 26a and 26b tending to force them or move them outwardly into position for engagement with cooperating blade straddling claws. Thus, whether the claws be of the type shown in FIG. 1 or FIG. 2, or whether the claws have a variable dimension or width spacing due to manipulation of the claws in use, the improved blade construction of the present invention is readily adapted to such claws. Compensation on the order of 0.060 to 0.075 inch have been made using my novel backing strip.

There has been provided by the present invention an improved universal blade construction that is adapted to be used with windshield wiper assemblies including yokes having claws of different dimensions therebetween. Essentially, the blade construction comprises a backing strip including a pair of interconnected side rails providing a longitudinal slot like opening for engaging a blade. The side rails are bowed outwardly intermediate their ends, in order to provide a maximum transverse dimension greater than the maximum dimension if the side rails were parallel. Preferably, the improved backing strip of the blade construction is made from spring steel, which has the material of the side rails upset centrally of the ends and inwardly of the longitudinal center line of each side rails in order to create the desired bowing effect. Another aspect of the invention lies in the method of upsetting the side rails in order to create the desired self-adjusting effect of the backing strip.

Blade constructions made in accordance with the prsent invention, can readily be adapted for use with the type of wiping arms or superstructures shown in FIGS. 1 and 2, as well as other types of arm constructions formed by manually working the claws to different dimensions, as might occur in actual practice through extended use. In each case, the blade construction will be properly self-adjusting.

While there has been described a presently preferred form of the invention, it will be understood by those skilled in the art that the invention is not limited thereto since it may be otherwise embodied within the scope of the following claims:

I claim:

1. A method of forming a backing strip for a wiper blade construction comprising the steps of forming substantially parallel side rails, and upsetting the material of the side rails centrally of the ends so as to bow laterally outwardly the portions of the side rails between the center and the ends.

2. The method of claim 1 wherein the backing strip is made from spring metal that is upset inwardly of the longitudinal center line of its side rail.

3. The method of claim 1 wherein the upsetting is performed by center punching the side rails.

4. A method of forming a backing strip for a universal blade construction adapted to be used with windshield wiper assemblies including supports having claws of different dimensions therebetween straddling and engaging the blade construction for retaining same, comprising the steps of forming substantially parallel side rails with a longitudinal slot-like opening therebetween for receiving a blade, and upsetting the material of the side rails centrally of the ends so as to bow laterally outwardly the portions of the side rails between the center and the ends in order to provide a maximum transverse dimensions for the backing strip greater than the maximum transverse dimension if the side rails were parallel.

* * * * *